UNITED STATES PATENT OFFICE.

HERMAN HEUSER, OF CHICAGO, ILLINOIS.

MANUFACTURE OF NON-INTOXICATING HOPPED BEVERAGES.

1,302,550.     Specification of Letters Patent.     Patented May 6, 1919.

No Drawing.     Application filed July 8, 1918. Serial No. 243,951.

*To all whom it may concern:*

Be it known that I, HERMAN HEUSER, a citizen of the United States, residing at Chicago, in the county of Cook and State of Illinois, have invented certain new and useful Improvements in the Manufacture of Non-Intoxicating Hopped Beverages, of which the following is a specification.

My invention relates to the manufacture of non-intoxicating hopped beverages in imitation of beer-beverages, and in particular it refers to the hopping of such beverages.

In the usual practice these beverages are hopped as such and usually during boiling in the kettle; thus alcohol-reduced beer is hopped during boiling in the kettle and generally while it is being boiled for the reduction of its alcoholic content.

By my invention I impart the taste and flavor of hops to alcohol-reduced beverages after the boiling to reduce their alcohol content is completed, by making at non-boiling temperature a solution containing the extractive substances of hops and mixing the alcohol-reduced beverage with this solution, which also does not possess the acid character of beer, thereby eliminating the boiling of the hops and avoiding hopping the beer directly and obviating the tannin-elimination and not only retaining the tannin astringency characteristic of the taste of the original liquid but also preserving its protein or albuminoid content. For this purpose I preferably hop a carbohydrate solution, which may be made with water and dextrin, or with water and dextrin-rich glucose or any other sugar customarily used for the sweetening of non-intoxicating beverages, though I may merely hop water with satisfactory results. However, unlike water, the employment of a carbohydrate solution for hopping preferably possessing the gravity of the alcohol-reduced beer is as a rule desirable as it does not lower the gravity of the beer after it has been added to it.

In order that my process may be understood I will describe it when employed for the manufacture of a non-intoxicating hopped beverage from fermented beer. Assuming that the quantity to be processed is 100 barrels of beer of customary composition and regular alcoholic character, this quantity is boiled in the kettle until the alcoholic content by volume has been reduced to the desired degree, say 0.07%, after the volume-rectification to the original quantity of 100 barrels by the addition of water has taken place. Thereupon the alcohol-reduced beer is cooled to a suitable temperature, say about 48° Fahrenheit, at which temperature it is stored for a suitable period, say a week, after it has received an addition of a small quantity of kraeusen, say 5 barrels made from regular wort and pitched with 1½ pounds of strong and vigorous yeast per barrel. By the fermentation thus introduced the beverage increases its alcohol-content to about 0.12%, becoming at the same time improved in taste and flavor due to the taste and flavor giving substances imparted to it by the action of yeast.

After storing the beverage for the desired length of time I subject it to the hop-treatment referred to above, and instead of directing hopping the yeast-treated beverage I apply the hopping to a carbohydrate solution, which is subsequently added to the beverage. For the purpose of preparing this solution I add to twenty (20) barrels of a 5% dextrin solution possessing a non-boiling temperature, which in the present instance is 172° Fahrenheit, about twenty-four (24) pounds of hops, and preferably agitate the solution by mechanical stirring for a suitable length of time, say from 1 to 2 hours, according to the degree of hopping desired in the final beverage, and preferably I loosely pack hand-crushed hops in a number of bags which I suspend in the solution. While this temperature is suitable for making the hop-solution, from 140° to 190° Fahrenheit forms a suitable range of temperature for my non-boiling hop-treatment, for these temperatures being pasteurizing or sterilizing temperatures supplement the natural preserving action of the dissolved tannin and resins of hops upon the ferments that always adhere to the hops in considerable quantities; the hopping temperature may be somewhat increased, or it also may be lowered to any temperature at which the carbohydrate solution acts to sufficiently dissolve or extract the extractive substances of the hops, but if low temperatures are employed the extraction should preferably be started with a high sterilizing temperature and then, after a brief exposure to such temperature, be carried on at the chosen temperature for a time suitably extended in view of the lower temperature. The temperature range for hopping the carbohydrate solution may be lowered to the storage or cellar temperatures of beer, though these low temperatures should be employed only in exceptional cases for while they do not obstruct the imparting to the solution of the volatile flavor, they greatly delay the imparting or dissolution of the non-volatile hop substances, the tannin and resins, which are the most important substances in the hop-treatment of non-intoxicating hopped beverages. When the time required for hopping is not important and can be freely extended without impairing the working capacity of the plant, the carbohydrate solution may be hopped for a prolonged period at the storage temperature of beer, preferably however under conditions excluding deterioration or infection from the fungi and bacteria always attached to the hops. While the tannin and resins of hops tend to preserve the carbohydrate solution, they do so only after they have been dissolved in it, and as this requires much time at beer-storage temperatures, precautionary measures for preserving the solution should be employed.

After the carbohydrate solution is hopped it is cooled, to about 34° Fahrenheit, and then added to the alcohol-reduced beer cooled to about the same temperature. With the addition of the hopped carbohydrate solution a snappy hop taste characterized by a very agreeable tannin-astringency is imparted to the beverage, and this is important because the base beverages used in the manufacture of non-intoxicating hopped beverages in imitation of beer contain as a rule much less taste giving substances than regular beer, and therefore they require the imparting of this characteristic taste in full measure and to a much larger extent than does regular beer. The beverage may then be treated in any customary way to make it ready for carbonation and filtration preliminary to the filling into the trade packages.

My invention is applicable to any base beverage used in the manufacture of non-intoxicating or temperance beverages that requires hopping for any reason, as for example merely alcohol-reduced beer, or alcohol-reduced unhopped wort made with or without malt, or such wort acidified by the addition of commercial lactic acid or by the action of lactic acid bacteria. The term alcohol reduced applies to beverages from which the alcohol has been either entirely removed or so far reduced that they come within the classification of non-intoxicating beverages.

This application is a continuation of parts of my copending application filed July 25th, 1914, and bearing Serial Number 853,059.

I claim:—

1. In the manufacture of non-intoxicating hopped beverages, the process of imparting to an alcohol-reduced beverage the taste and flavor of hops which consists in making a solution containing the extractive substances of hops at a temperature below boiling, and adding the solution to the beverage after the alcohol reduction of the latter is completed.

2. In the manufacture of non-intoxicating hopped beverages, the process of imparting to an alcohol-reduced beverage the taste and flavor of hops which consists in hopping a carbohydrate solution at a temperature below boiling, and adding the solution to the beverage after its alcohol content is reduced.

3. In the manufacture of non-intoxicating hopped beverages, the process of imparting to an alcohol-reduced beverage the taste and flavor of hops which consists in hopping at a temperature below boiling a carbohydrate solution possessing approximately the gravity of the alcohol-reduced beverage, and adding the solution to the beverage after its alcohol content is reduced.

4. In the manufacture of non-intoxicating hopped beverages, the process which consists in reducing the alcohol content of beer or fermented wort, rectifying this body of liquid to its original volume, cooling the liquid, hopping a carbohydrate solution at a temperature below boiling, cooling the hopped solution, and adding the solution to the liquid.

5. In the manufacture of non-intoxicating hopped beverages, the process which consists in reducing the alcohol content of beer or fermented wort, rectifying this body of liquid to its original volume, cooling the liquid, adding kraeusen to the cooled liquid, hopping a carbohydrate solution at a temperature below boiling, cooling the hopped solution, and adding the solution to the liquid.

6. In the manufacture of non-intoxicating hopped beverages, the process which consists in reducing the alcohol content of beer or fermented wort, rectifying this body of liquid to its original volume, cooling the liquid, adding kraeusen to the cooled liquid, hopping a dextrin-rich solution at a temperature below boiling, cooling the hopped solution, and adding the solution to the liquid.

In testimony whereof I affix my signature in presence of two witnesses.

HERMAN HEUSER.

Witnesses:
J. McROBERTS,
BERNICE GORMLEY.